Sept 10, 1957      G. JOHNS ET AL      2,805,923
APPARATUS FOR CHEMICALLY TREATING WATER
Filed Dec. 7, 1953
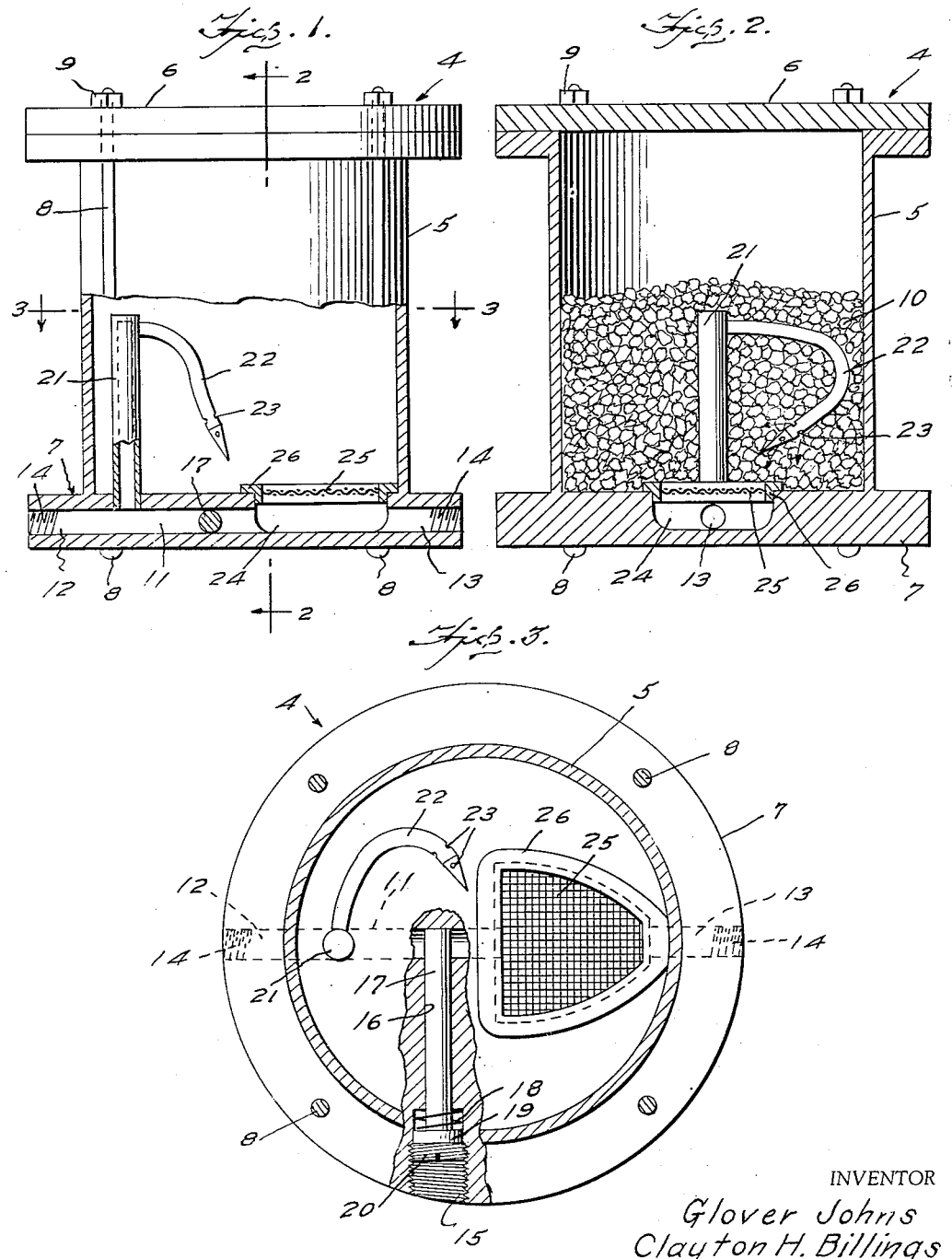
INVENTOR
Glover Johns
Clayton H. Billings
BY
ATTORNEY

United States Patent Office 2,805,923
Patented Sept. 10, 1957

2,805,923

APPARATUS FOR CHEMICALLY TREATING WATER

Glover Johns and Clayton H. Billings, Austin, Tex.

Application December 7, 1953, Serial No. 396,398

5 Claims. (Cl. 23—267)

The present invention relates to the chemical treatment of water, and more particularly to a method and apparatus for adding minute quantities of a chemical at a controlled rate to a domestic water supply.

The chemical treatment of water through the use of a feeder tank including means for diverting a portion of a water line through the desired concentration has long been known in the art, as illustrated by the patent to Sevcik, No. 1,409,248, granted March 14, 1922. With chemical feeders of this type, however, there is an ever-present danger that toxic or harmful concentrations of the chemical may be introduced into the water by the use of water-soluble chemical treating agents and/or the uneven distribution of the chemical in the water.

It is an object of this invention, therefore, to provide a method for treating drinking water by means of a crystalline water-insoluble chemical agent which positively precludes the danger of introducing harmful concentration of the treating agent into the water.

Another object of the present invention is to provide means for agitating the water being treated, which agitation hastens solution of the chemical and allows a more even distribution of the agent in the water.

A further object of the invention is to provide a small scale chemical feeder which is especially adapted for insertion in the water supply line of a house, apartment, school, etc., installation thereof being facilitated by the fact that no auxiliary valves or pipes are required, connection with the water supply being effected by engagement of the inlet and outlet pipes of the present device with the supply line.

The invention, together with its objects and advantages, will be best understood by reading the following detailed description with reference to the accompanying drawings in which is illustrated a presently preferred embodiment of the invention, and wherein:

Fig. 1 is a side elevational view of the present invention, parts thereof being broken away to disclose details;

Fig. 2 is a vertical sectional view taken along the line 2—2 of Fig. 1, looking in the direction of the arrows and showing to advantage the chemical treating agent and the water feeding structure, and Fig. 3 is a sectional view taken along the line 3—3 of Fig. 1, looking in the direction of the arrows, parts thereof being broken away to disclose details of the valve structure.

In carrying out the objects of this invention, we have provided a chemical feeder tank 4 which includes a cylindrical body 5 molded of copper, plastic or any other suitable material, a top 6 and a bottom 7. Connecting top 6 and bottom 7 are a plurality of upwardly extending bolts 8 threaded at their upper ends to receive retaining nuts 9. This permits the removal of top 6 for the purpose of adding chemical agent 10 or for cleaning the tank.

In the bottom 7 of the feeder tank is a water conduit 11 having an inlet end 12 and an outlet end 13 both of which are threaded, as indicated at 14, for ready attachment to a water line. A radial opening 15 is also formed in the bottom 7 of the tank, this opening issuing into a valve-receiving passageway 16 and leads into the water conduit 11 between the inlet and outlet ends thereof. A conventional needle valve 17 is mounted in the opening 15 and passageway 16, as shown in Fig. 3, to regulate the amount of water to be directed into the feeder tank. This valve may be mounted in any suitable manner so as to positively preserve the setting of the valve in order that a predetermined amount of water may be permitted to enter the tank. The means for preserving the setting of the valve may consist of a helical spring 18 convoluted on the shank of the valve and adapted to abut the shoulder at the juncture of the opening 15 and the passageway 16 at one end, the opposite end of the spring abutting the inner wall of the valve head 19. A screw-threaded cap 20 is engaged with complemental threads in the opening 15, the cap being provided with a kerf to facilitate rotation of the cap. This structure, in addition to retaining the valve in a predetermined adjusted position, also discourages tampering with the valve.

Located between inlet 12 and needle valve 17, and in communication with conduit 11, is a vertical feeder pipe 21, the upper end of which is sealed. Feeder pipe 21 is provided near its upper terminal with an opening for the reception of a helical jet tube 22. Tube 22 has a plurality of small openings 23 near the free end thereof through which jets of water pass, the openings being located to spray water in varying directions, except upwardly. The force of the jet streams agitates the water in the tank, hastens solution of the chemical and causes an even distribution of the chemical agent in the water.

The bottom of tank 4 is provided with an outlet trough 24 between needle valve 17 and outlet 13, through which the treated water passes to the outlet end 13 of water conduit 11 where it mixes with the untreated water which has passed needle valve 17, to effect the desired concentration of the water. Trough 24 is covered with a fine mesh screen 25 to prevent chemical agent 10 from being delivered to conduit 11. A flange 26 retains screen 25 in position.

It is within the contemplation of this invention to use, as the treating agent for the water, a water-insoluble chemical, the particular agent to be used depending upon the type of water treatment desired. For example, in the addition of the fluoride ion to drinking water for checking tooth decay, a fluoride-bearing crystalline compound such as commercial fluorspar may be used. We have found that best results are obtained with granules crushed to such a size that they will pass a sieve having four meshes to the inch and be retained by a sieve having eight meshes to the inch. After crushing, the granules are placed in water-soluble capsules which are deposited in the tank when needed. This obviates the necessity of handling any toxic chemicals and facilitates storage.

In use, conduit 11 of tank 4 is first connected to the water supply line. Needle valve 17 is then adjusted to produce the desired concentration of the agent in the water. Opening the valve allows a greater amount of untreated water to pass through the conduit to the outlet end 13, thereby reducing the concentration whereas closing the valve directs a larger amount of water through the pipe 21, jet tube 22 and into the chemical agent 10 of the feeder tank to increase the concentration. By fluoridating drinking water with the present device, needle valve 17 can be adjusted to effect an average ratio of the fluoride ion to the water system of one part fluoride to a million parts water or any other ratio desired to a maximum of two parts fluoride to a million parts water. As the water enters inlet 12 of conduit 11, either part or all of it flows into feeder pipe 21 and is expelled, under pressure, from jet tube 22. This causes agitation of the water in the bottom of tank 4 to hasten solution of chemical agent 10 in the water before the water reaches the outlet end 13.

While we have herein shown and described a preferred form of our invention, it is to be understood that various changes may be made therein within the scope of the claims hereto appended.

What we claim is:

1. A chemical feeder for connection with a water supply line including a tank, granular water-insoluble crystals within the tank, a water conduit in the bottom of said tank and connected to the water line, a downwardly projecting spray pipe within the tank in communication with said conduit, said spray pipe having openings for emitting water under pressure to agitate the crystals and hasten solution thereof in the water, means for delivering part or all of the water, entering the conduit, to said spray pipe, and a tank outlet through which the treated water passes into the water line.

2. A chemical feeder for connection with a water supply line including a tank provided with a chemical agent, a water conduit integral with the bottom of said tank and connected to the water line, a feeder pipe within the tank and in communication with said conduit, means for delivering a part or all of the water to said feeder pipe, a tube connected at one end to said feeder pipe, said tube projecting downwardly into the tank and provided at its free terminal with openings for emitting water under pressure to agitate the agent and hasten solution thereof in the water, and means for delivering the treated water to the water supply line.

3. A chemical feeder for connection with a water supply line as set out in claim 2 wherein the tube is helical in shape to impart a horizontal and spiral motion to the water in the tank.

4. A chemical feeder for connection with a water supply line including a tank, a chemical agent in said tank, a spray pipe within the tank in communication with the water supply line, said spray pipe projecting downwardly in the tank and having openings for emitting water under pressure to agitate said chemical agent and hasten solution thereof in the water, and a tank outlet through which the treated water returns to the water supply line.

5. A chemical feeder as set out in claim 4 wherein the chemical agent comprises water insoluble crystals.

References Cited in the file of this patent

UNITED STATES PATENTS

| | | |
|---|---|---|
| 132,439 | Chandler | Oct. 22, 1872 |
| 432,773 | Jewell | Mar. 18, 1890 |
| 762,931 | Nord | June 21, 1904 |
| 1,066,266 | Garfield | July 1, 1913 |
| 1,173,365 | McComb | Feb. 29, 1916 |
| 1,335,802 | Stewart | Apr. 2, 1920 |
| 1,806,698 | Miller | May 26, 1931 |
| 2,067,328 | Lux | Jan. 12, 1937 |
| 2,172,546 | Riel | Sept. 12, 1939 |
| 2,331,598 | Cook et al. | Oct. 12, 1943 |
| 2,462,886 | Morrow | Mar. 1, 1949 |
| 2,573,576 | Klumb | Oct. 30, 1951 |